United States Patent Office 2,985,697
Patented May 23, 1961

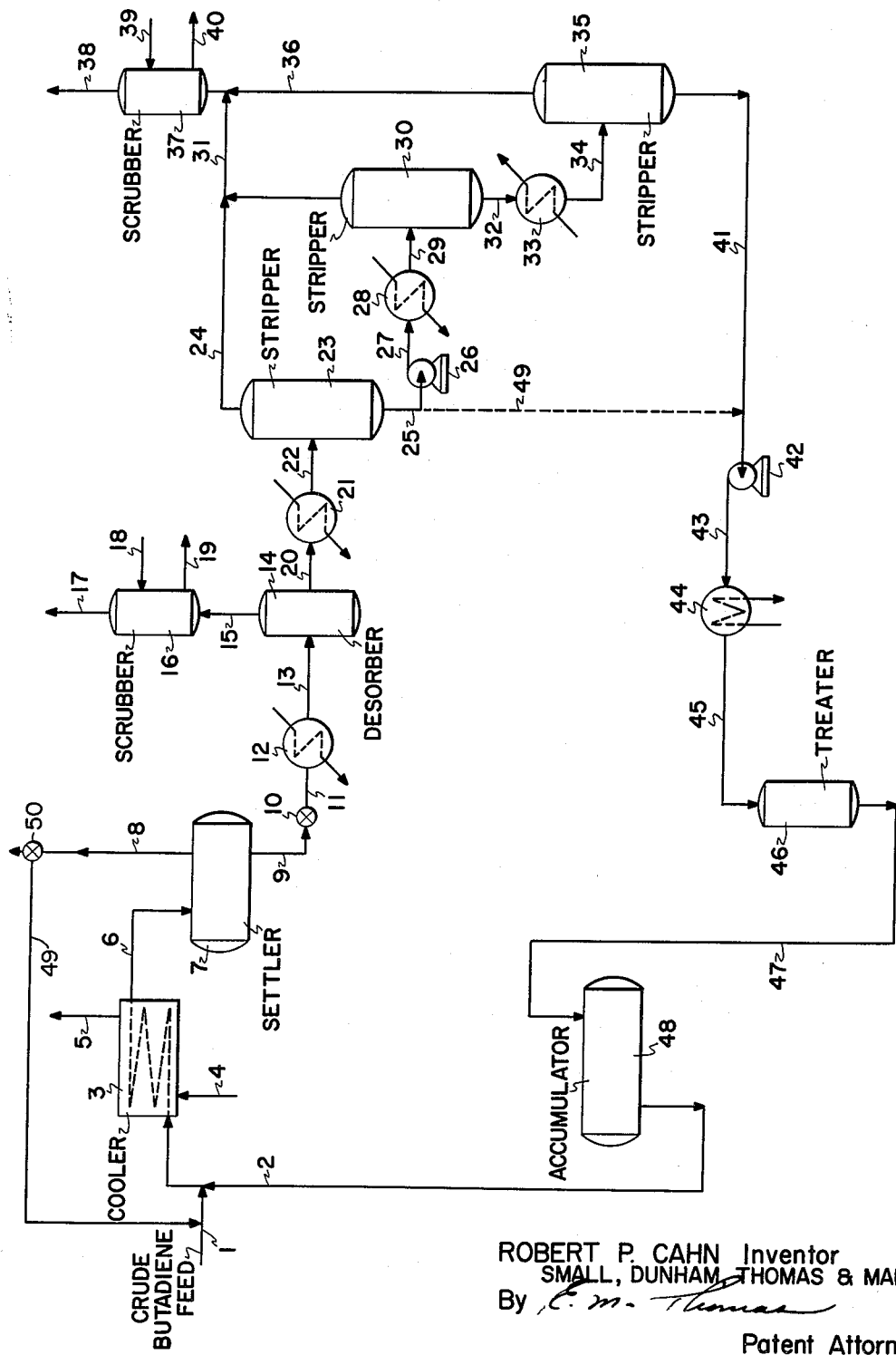

2,985,697

OPERABILITY OF CAA PRETREAT UNITS FOR ACETYLENE REMOVAL

Robert P. Cahn, Elizabeth, N.J., assignor to Esso Research and Engineering Company, a corporation of Delaware Filed May 1, 1959, Ser. No. 810,403

6 Claims. (Cl. 260—681.5)

This invention relates to an improved prewash system for removal of acetylenes from a butadiene-bearing stream prior to extraction of the butadiene in an extraction plant, particularly a plant which uses a cuprous ammonium acetate solution or similar kind of solvent. More particularly, this invention relates, where levels of acetylenes above 2500 p.p.m. are encountered, to recycling a substantially acetylene free butadiene-bearing stream to reduce the level of acetylenes in the feed stream to below said level.

The butadiene-bearing streams from some source such as non-catalytic thermal cracking tend to contain substantial amounts of acetylenes like vinyl acetylene and ethyl acetylene that are known to cause difficulties due to polymerization, etc. in the extraction and purification of butadiene. Although a number of methods were devised for removing polymers, etc. after extraction of the butadiene it was later found that a pretreat system which was intended to eliminate the acetylenes from the butadiene containing feed prior to the extraction of the butadiene preferably using cuprous ammonium acetate as the solvent was the preferred method of handling this problem. A typical pretreat process was shown, for example, in U.S. Patent 2,847,487. Thus, a selective extraction of the acetylenes followed by rejection of the extracted acetylenes from the solvent and recycle of the stripped solvent to the pretreat process was obtained. The solvent cleanup was, of course, carried out in such a way as to minimize polymerization of acetylenes and maximize recovery of butadiene. By this pretreat process the acetylene content of the butadiene-containing $C_4$-cut could be reduced to 1–500 p.p.m.

Although this pretreat process is preferred, nevertheless difficulties have been encountered in the commercial operation of the process. Thus, it was discovered that when the butadiene-bearing feeds contained more than about 2500–3000 p.p.m. acetylenes (as occurs where more severe steam cracking, to obtain particularly large yields of light materials such as ethylene, propylene and butadiene, is utilized) that precipitation of copper acetylides in the cuprous ammonium acetate solution occurred. This precipitation caused fouling and plugging of treating tanks, heaters, heat exchangers, pumps, and towers in the pretreat section which resulted in shutdowns and other costly upsets in the system. It was further discovered, surprisingly, that increasing solvent treat rates alone did not result in obtaining smooth operation of the commercial plants. Thus, although it was found that increasing the amount of cuprous ammonium acetate supplied reduced somewhat the total amount of acetylides precipitated that nevertheless localized conditions existed in the equipment, wherein precipitation of difficultly soluble acetylides still occurred. Additionally, these precipitated materials due to their limited solubility were not appreciably redissolved by the increased amount of solvent circulated and the same plugging problems were encountered. As a further deterrent, excessive increases in solvent circulation rates result in increased undesirable extraction of butadiene in the prewash step. Most of this material is recovered from the solvent solution in the butadiene recovery stage of the prewash process but part of it is still lost.

It has now been surprisingly discovered that by recycling already treated and already substantially acetylene free butadiene-containing $C_4$ cut to the pretreat operations (i.e. said treated butadiene cut containing less than 600, preferably less than 400 p.p.m. acetylenes) so as to reduce acetylene contents in the entering stream to below 2500 p.p.m., preferably below 2000 p.p.m., that these acetylide precipitation and plugging problems can be effectively overcome. This recycle process obtains much longer onstream periods, smoother operation, and less upsets which result in unnecessary solvent and butadiene losses.

A typical prewashing system for eliminating acetylenes from butadiene-bearing streams prior to extraction of the butadiene will now be described. The entering stream is admixed with a cuprous salt solvent such as designated in the patent which is above referred to, U.S. 2,847,487. In general, these solvents are made up of a cuprous salt, a fatty acid radical, and an alkaline radical such as ammonium or an organic nitrogen base.

Analysis of a typical such solvent:

| Component: | Range (as moles/liter) |
|---|---|
| Cupric copper | 0.2–0.3 |
| Cuprous copper | 2.8–3.5 |
| Ammonia | 8.0–12.0 |
| Acetate (as acetic acid) | 3.5–4.5 |
| Water (average) | 30.9 |

The composition of the cuprous salt solutions may, of course, be varied in many ways well known.

The cuprous ammonium acetate solution may be prepared by reacting ammonia-ammonium acetate solution with copper shot in a tower together with a controlled amount of air. The concentration of the cuprous ion in the cuprous ammonium acetate solution is in the range of 2.8 to 3.5 gram-mols/liter, preferably 3.0. Treating rate, on a weight basis, of cuprous ammonium acetate solution to acetylenes in the $C_4$ feed are in the range of 200/1 to 300/1, with 200/1 being a safe lower limit. Temperatures are in the range of 20° to 60°, preferably 40° F., pressures are sufficient to keep the hydrocarbon in the liquid phase, and contacting plus settlings times are in the range of 15 to 25 min., preferably 20 min.

A typical commercial operated acetylene removal system is shown in the attached schematic flow plan figure. The crude butadiene bearing $C_4$ hydrocarbon stream is passed through line 1 together with recycle lean cuprous ammonium acetate solution supplied through line 2 to chiller 3. Liquid ammonia is supplied through line 4 to this chiller to supply refrigeration and gaseous ammonia is removed through line 5. From the chiller the combined stream is passed through line 6 to settler 7 where the treated butadiene containing $C_4$ stream is taken overhead through line 8. A sufficient amount of the treated butadiene $C_4$ stream is recycled to line 1 via valve 50 and line 49 to reduce the content of acetylenes in the total feed stream to below 2500 p.p.m. The hydrocarbon, which is not recycled and which is essentially acetylene free, is passed on to the butadiene extraction system (not shown) for further processing. The acetylene rich cuprous ammonium acetate solution from the settler is passed through line 9 to release valve 10 where its pressure is decreased to about 10 to 40 p.s.i.g., preferably 15 p.s.i.g. Thence through line 11 it is passed to heater 12 where the temperature is raised to about 100 to 185° F., preferably 130° F. The warm solution is then passed through line 13 to butadiene desorber flash drum 14 where the solution is flashed at about 15 p.s.i.g. Here the small amounts of butadiene absorbed in the solution are selectively desorbed. This butadiene flashed overhead through line 15 is then water scrubbed in scrubber 16 to remove ammonia and the butadiene is recovered through line 17. The water is supplied to the scrubber through lines 18 and 19. From the butadiene desorber the cuprous ammonium acetate solution is passed through line 20 to heater 21 where its temperature is raised to 150 to 210° F., preferably 185° F. The material is then passed through line 22 and is flashed in stripper 23 to a pressure of about 5 to 25 p.s.i.g., preferably 15 p.s.i.g. The acetylenes are desorbed overhead through line 24. The CAA solution may be passed through line 49 to cooler 44 and char treater 46, or go through a further series of flash steps as follows. The cuprous ammonium acetate solution is passed through line 25 to pump 26 through line 27 to heater 28 where its temperature is raised to about 150 to 210° F., preferably 185° F., to line 29 and is again flashed in stripper 30 to a pressure of about 5 to 25 p.s.i.g., preferably 15 p.s.i.g. Acetylenes may again be taken overhead through line 31 and the cuprous ammonium acetate solution may be passed through line 32 to heater 33 where its temperature is raised to about 175 to 210° F., preferably 200° F., to line 34 and is flashed in the last stripper 35 to a pressure of about 2 to 10 p.s.i.g., preferably 5 p.s.i.g. Acetylenes are again taken overhead through line 36 where they are joined by the acetylenes removed in strippers 33 and 30 from line 31 and are passed to water scrubber 37. Here ammonia is removed and the acetylenes are passed to the atmosphere through line 38. Water is supplied through lines 39 and is removed through line 40. From the bottom of stripper 35 acetylene free cuprous ammonium acetate is passed through line 41, pump 42 and line 43 to cooler 44 where its temperature is reduced to about 75 to 120° F., preferably 100° F. It is then passed through line 45 to char treater 46 for removal of polymerized copper acetylides. Cuprous ammonium acetate solution ready for recycle is then passed through line 47 to solution accumulator 48 and thence through line 2 to the process as previously described.

The following Examples 1 through 3 report data which were obtained in commercial operations where low and high acetylene contents in the feed were encountered. Additionally, data is reported on attempts to remove the difficulties encountered with high acetylene feeds by increasing treat rates.

*Example 1*

A $C_4$ fraction, obtained from steam cracking of gas oils, containing 1000–2000 p.p.m. of acetylenes was passed to a system as described in the figure where only a single flash step is carried out after the butadiene desorption. Smooth operations utilizing a 0.2–0.4/1 weight ratio of CAA/hydrocarbon (200# CAA/# acetylene) treat rate were obtained and on stream times averaging 3 months or better were possible.

*Example 2*

A $C_4$ butadiene stream from high severity cracking of naphthas containing above 2500 p.p.m., i.e. 4000–5000 p.p.m. acetylenes, was passed to a single flash after butadiene desorption system as described in the figure. CAA treat rates were 0.3–.5 wt. CAA/wt. hydrocarbon (about 100# CAA/# acetylene). Difficulties were encountered in heaters 12 and 21, in pump 42, and in flashes 14 and 23. The precipitate of copper acetylide plugged lines and exchangers, so that on-stream periods of only 1–2 weeks at most were obtained.

*Example 3*

A $C_4$ butadiene fraction from high severity steam cracking of naphtha containing above 2000 p.p.m., i.e. 4000–5000 p.p.m. acetylenes were passed to a single flash after butadiene desorption system as described in the figure. CAA treat rates this time were 0.8–1.0 wt. CAA/wt. hydrocarbon (200# CAA/# acetylene). Nevertheless difficulties were encountered in heaters 12 and 21, and the suction of pump 42. On-stream periods of only 1 month were obtained.

It can thus be seen from these examples that (a) smooth operations are obtained where acetylene content below 2000–2500 p.p.m. is present in the feed stream, (b) that difficulties are encountered where conventional cuprous ammonium acetate treat rates were high, i.e. above 2500 p.p.m. levels of acetylene are present in the feed stream, and (c) that these difficulties are not removed by merely increasing cuprous ammonium acetate treat rates.

What is claimed is:

1. In a cuprous ammonium acetate pretreat process for the removal of acetylenes from $C_4$ butadiene-rich feed streams that contain acetylenes, in excess of 2500 p.p.m., recycling substantially acetylene-free treated butadiene-bearing product to the process in amounts sufficient to reduce the content of acetylenes in the total feed stream treated to below 2500 p.p.m. of acetylenes.

2. The process of claim 1 in which the substantially acetylene free treated butadiene-bearing product recycled contains less than 600 p.p.m. acetylenes.

3. The process of claim 1 in which sufficient substantially acetylene free treated butadiene-bearing product is recycled to the process to reduce the average content of acetylenes in the total feed stream treated to below 2000 p.p.m. of acetylenes.

4. In a cuprous ammonium acetate pretreat process for the removal of acetylenes from $C_4$ butadiene-rich feed stream that contains acetylenes in an amount in excess of 3000 p.p.m., the improvement which comprises, recycling substantially acetylene-free treated butadiene-bearing product to the feed stream in amounts sufficient to reduce the content of acetylenes in the total feed stream treated to below 2500 p.p.m. of acetylenes.

5. The process of claim 4 in which the substantially acetylene free treated butadiene-bearing product recycled contains less than 600 p.p.m. acetylenes.

6. The process of claim 4 in which sufficient substantially acetylene free treated-butadiene-bearing product is recycled to the process to reduce the average content of acetylenes in the total feed stream treated to below 2000 p.p.m. of acetylenes.

References Cited in the file of this patent
UNITED STATES PATENTS

| | | |
|---|---|---|
| 2,788,378 | Cotton et al. | Apr. 9, 1957 |
| 2,870,232 | Wilson et al. | Jan. 20, 1959 |